United States Patent
Qian et al.

(10) Patent No.: US 9,279,936 B2
(45) Date of Patent: Mar. 8, 2016

(54) OPTICAL DEVICE HAVING LIGHT SENSOR WITH DOPED REGIONS

(75) Inventors: Wei Qian, Torrance, CA (US); Dazeng Feng, El Monte, CA (US); Mehdi Asghari, Pasadena, CA (US)

(73) Assignee: Kotura, Inc., Monterey Park, CA (US)

(*) Notice: Subject to any disclaimer, the term of this patent is extended or adjusted under 35 U.S.C. 154(b) by 296 days.

(21) Appl. No.: 13/507,468

(22) Filed: Jun. 28, 2012

(65) Prior Publication Data
US 2013/0020668 A1    Jan. 24, 2013

Related U.S. Application Data

(60) Provisional application No. 61/572,841, filed on Jul. 21, 2011.

(51) Int. Cl.
*H01L 31/0232* (2014.01)
*G02B 6/12* (2006.01)
*G02B 6/13* (2006.01)

(52) U.S. Cl.
CPC ............ *G02B 6/12004* (2013.01); *G02B 6/131* (2013.01); *G02B 2006/12061* (2013.01); *G02B 2006/12176* (2013.01)

(58) Field of Classification Search
CPC .............. H01L 31/035281; H01L 31/1808; H01L 31/1812; H01L 31/105; G02B 6/12204; G02B 6/1228
USPC ............... 356/73; 372/99; 257/432, E31.127; 385/43
See application file for complete search history.

(56) References Cited

U.S. PATENT DOCUMENTS

| 3,242,606 A | 3/1966 | Harrick |
| 3,242,805 A | 3/1966 | Harrick |
| 3,753,157 A | 8/1973 | Ash |

(Continued)

FOREIGN PATENT DOCUMENTS

| JP | 62165981 | 7/1987 |
| WO | WO2007049260 | 5/2007 |
| WO | WO2007/084137 | 7/2007 |

OTHER PUBLICATIONS

D. Ahn, C-Y. Hong, J. Liu, W. Giziewics, M. Beals, L. C. Kimerling, and J. Michel, "High performance, waveguide integrated Ge photodetectors," Opt. Express, 15, 3916 (2007).

(Continued)

*Primary Examiner* — Kenneth Parker
*Assistant Examiner* — Bo Fan
(74) *Attorney, Agent, or Firm* — Gavrilovich, Dodd & Lindsey, LLP

(57) ABSTRACT

The optical device includes a waveguide on a base. The waveguide is configured to guide a light signal through a light-transmitting medium to a light sensor. The light sensor includes a sensor waveguide on the base. The sensor waveguide receives the light signal from the input waveguide. Additionally, the sensor waveguide includes a light-absorbing medium having an input side. The input side is interfaced with the light-transmitting medium such that at least a portion of the light signal received by the sensor waveguide travels through the input side of the light-absorbing medium upon being received by the sensor waveguide. The light-absorbing medium includes doped regions. One or more of the doped regions each extends from within the light-absorbing medium to the input side of the light-absorbing medium.

20 Claims, 8 Drawing Sheets

(56) References Cited

U.S. PATENT DOCUMENTS

| | | | |
|---|---|---|---|
| 4,784,452 A | 11/1988 | Hodge | |
| 4,923,264 A | 5/1990 | Langer | |
| 5,159,700 A | 10/1992 | Reid | |
| 5,448,536 A | 9/1995 | Muranishi | |
| 5,642,371 A | 6/1997 | Tohyama | |
| 5,963,358 A | 10/1999 | Shields | |
| 6,114,088 A | 9/2000 | Wolk | |
| 6,433,399 B1 * | 8/2002 | Polman et al. | 257/432 |
| 6,924,510 B2 | 8/2005 | Gardner | |
| 6,970,611 B1 | 11/2005 | Van Der Vliet | |
| 7,120,350 B2 | 10/2006 | Block | |
| 7,308,166 B1 | 12/2007 | Peng | |
| 7,339,724 B2 | 3/2008 | Hochberg | |
| 7,397,101 B1 | 7/2008 | Masini | |
| 7,643,714 B2 | 1/2010 | Hochberg | |
| 7,769,259 B1 | 8/2010 | Dong | |
| 2002/0181067 A1 | 12/2002 | Romanovsky | |
| 2002/0191916 A1 | 12/2002 | Frish | |
| 2003/0016896 A1 | 1/2003 | Azarbar | |
| 2005/0018276 A1 | 1/2005 | Kourogi | |
| 2005/0212068 A1 | 9/2005 | Leon | |
| 2007/0104411 A1 | 5/2007 | Ahn | |
| 2007/0189688 A1 | 8/2007 | Dehlinger | |
| 2008/0225267 A1 * | 9/2008 | Murtagh | G01N 21/1717 356/32 |
| 2008/0272391 A1 | 11/2008 | Kapur | |
| 2009/0022452 A1 | 1/2009 | Welch | |
| 2009/0127645 A1 * | 5/2009 | Knights | G02B 6/12004 257/432 |
| 2011/0068425 A1 * | 3/2011 | Liao et al. | 257/432 |

OTHER PUBLICATIONS

Jutzi et al., *Ge-on-So vertical incidence Photodiodes with 39-GHz Bandwidth*, IEEE Photonics TechnologyLetters, vol. 17, No. 7, Jul. 2005 (pp. 1510-1512).

Liu et al., *Tensile strained Ge p-I-n photodetectors on Si platform for C and L band telecommunications*, Appl. Phys. Lett. 87, 011110 (2005) (pp. 1-3).

Rouviere et al., *Integration of germanium waveguide photodetectors for intrachip optical interconnects*, Optical Engineering 44(7), 075402 (Jul. 2005) (pp. 1-5).

Vivien et al., *High speed and high responsivity germanium photodetector integrated in a Silicon-On-Insulator microwaveguide*, Jul. 23, 2007/ vol. 15, No. 15/Optics Express (pp. 9843-5).

L. Vivien, J. Osmond, J.-M. Fedeli, D. Marris-Morini, P. Crozat, J.-F. Damlencourt, E. Cassan, Y. Lecunff, S. Laval, "42 GHz p.i.n. Germanium photodetector integrated in a silicon-on-inculator waveguide," Opt. Express 17, 6252 (2008).

J. Wang, W. Y. Loh, K. T. Chua, H. Zang, Y. Z. Xiong, S. M. F. Tan, M. B. Yu, S. J. Lee, G. Q. Lo, and D. L. Kwong, "Low-voltage high-speed (18GHz/1V) evanescent-coupled thin-file-Ge lateral PIN photodetectors integrated on Si waveguide," IEEE Photon. Technol. Lett., 17, 1485 (2008).

T. Yin, R. Cohen, M. Morse, G. Sarid, Y. Chetrit, D. Rubin, and M. Paniccia, "31 GHz Ge n-i-p. waveguide photodetectors on Silicon-on-insulator substrate," Opt. Express, 15, 13965 (2007).

* cited by examiner

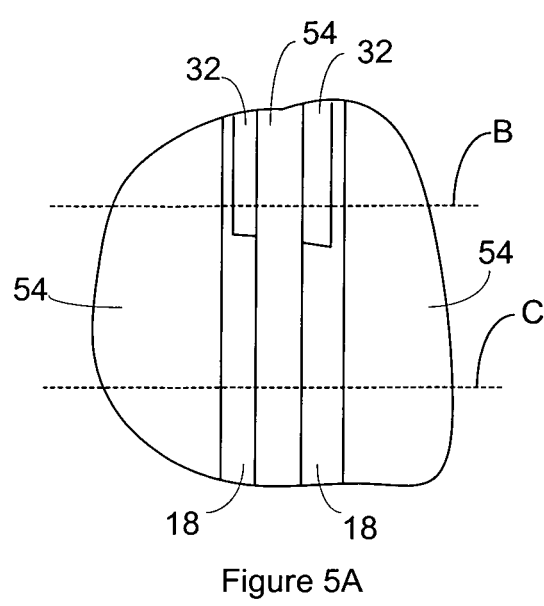
Figure 5A
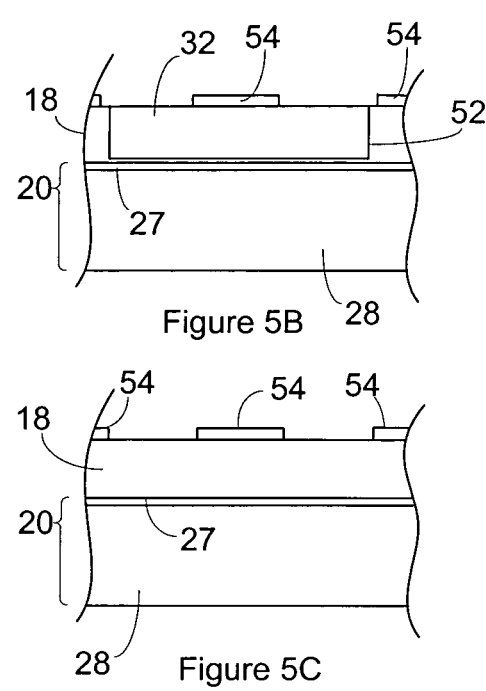
Figure 5B
Figure 5C

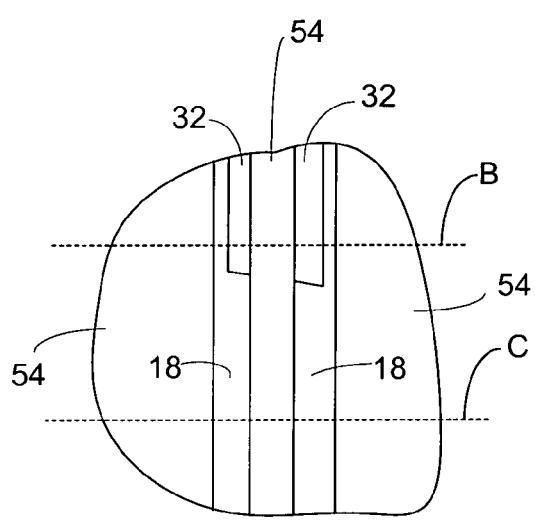
Figure 6A
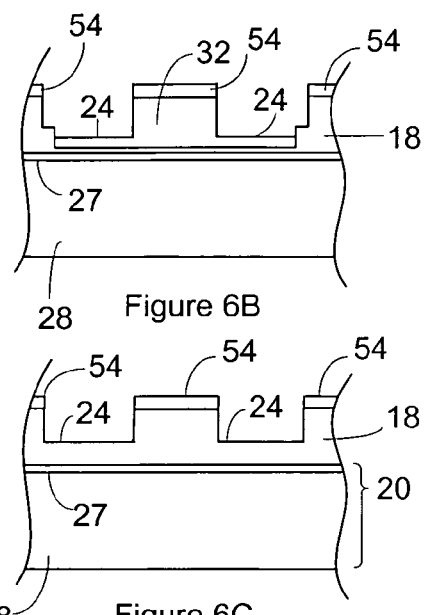
Figure 6B
Figure 6C
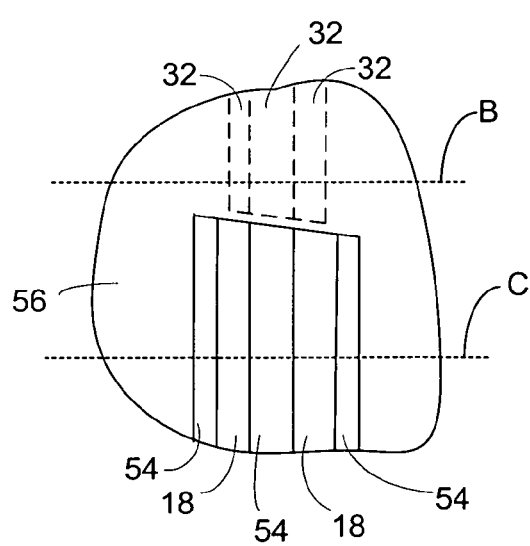
Figure 7A
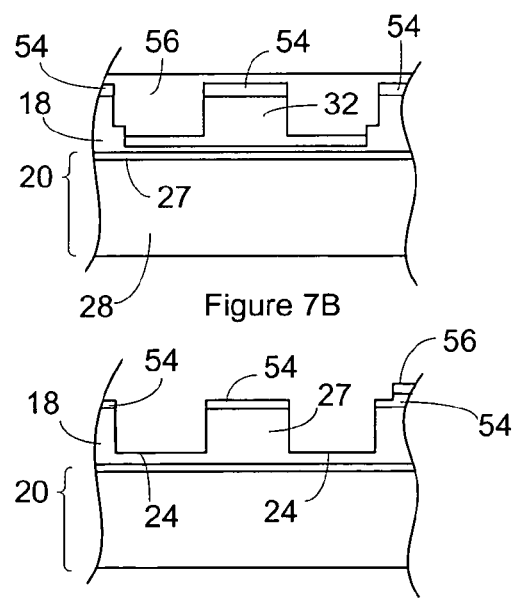
Figure 7B
Figure 7C

OPTICAL DEVICE HAVING LIGHT SENSOR WITH DOPED REGIONS

RELATED APPLICATIONS

This application claims the benefit of U.S. Provisional Patent Application Ser. No. 61/572,841, filed on Jul. 21, 2011, entitled "Optical Device Having Light Sensor with Doped Regions," and incorporated herein in its entirety. This application is related to U.S. patent application Ser. No. 12/380, 016, filed on Feb. 19, 2009, entitled "Optical Device Having Light Sensor Employing Horizontal Electrical Field," and also to U.S. patent application Ser. No. 12/584,476, filed on Sep. 4, 2009, entitled "Optical Device Having Light Sensor Employing Horizontal Electrical Field," each of which is incorporated herein in its entirety.

FIELD

The present invention relates to optical devices and more particularly to devices having a light sensor.

BACKGROUND

The use of optical and/or optoelectronic devices is increasing in communications applications. These devices can include light sensors that receive light signals from a waveguide. These light sensors often employ a light-absorbing material that absorbs the received light signals. During operation of the light sensor, an electrical field is applied across the light-absorbing material. When the light-absorbing material absorbs a light signal, an electrical current flows through the light-absorbing material. As a result, the level of electrical current through the light-absorbing material indicates the intensity of light signals being received by the light-absorbing material.

In these light sensors, increasing the voltage that is applied to the light sensor in order to generate the electrical field can often increase the speed of the light sensor. However, it is often desirable to reduce this voltage while still maintaining the same level of speed. As a result, there is a need for more efficient light sensors.

SUMMARY

The optical device includes a waveguide on a base. The waveguide is configured to guide a light signal through a light-transmitting medium to a light sensor. The light sensor includes a sensor waveguide on the base. The sensor waveguide receives the light signal from the input waveguide. Additionally, the sensor waveguide includes a light-absorbing medium having an input side. The input side is interfaced with the light-transmitting medium such that at least a portion of the light signal received by the sensor waveguide travels through the input side of the light-absorbing medium upon being received by the sensor waveguide. The light-absorbing medium includes doped regions. One or more of the doped regions each extends from within the light-absorbing medium to the input side of the light-absorbing medium.

BRIEF DESCRIPTION OF THE FIGURES

FIG. 1A is a perspective view of the device.

FIG. 1B is a cross-section of the device shown in FIG. 1A taken along the line labeled B.

FIG. 1C is a cross-section of the device shown in FIG. 1A taken along the line labeled C.

FIG. 1D is a cross-section of the optical device shown in FIG. 1C taken along the line labeled D and extending parallel to the longitudinal axis of the waveguide.

FIG. 3A through FIG. 11C illustrate a method of generating an optical device constructed according to FIG. 1A through FIG. 1F.

DESCRIPTION

The optical device includes a light-transmitting medium on a base. The device also includes a waveguide configured to guide a light signal through the light-transmitting medium. The optical device also includes a light sensor configured to receive the light signal from the waveguide. The light sensor includes a light-absorbing medium on the base. An input side of the light light-absorbing medium is interfaced with the light-transmitting medium such that the light-absorbing medium receives the light signal from the waveguide. Accordingly, the device includes an interface between the light-transmitting medium and the input side of the light-absorbing medium.

The light absorbing medium includes doped regions that are spaced apart from one another. During operation of the light sensor, electrical energy is applied to these doped regions so as to form an electrical field between the doped regions. When the light-absorbing material absorbs a light signal, an electrical current flows between the doped regions. Electronics can use the level of this current to determine the presence and/or intensity of light in the light sensor.

In prior light sensors, the doped regions were arranged so there is a gap between the doped regions and the input side of the light-absorbing medium. The inventors have found that during operation of the light sensor, the electrical field is formed directly between the doped regions but also forms weakly in this gap. The portion of the electrical field that forms in this gap decreases the speed of the light sensor that can be achieved for a particular voltage applied to the light sensor. In the current light sensor, the gap between the doped regions and the interface is removed. As a result, the light sensor has an increased efficiency.

Figure 1A:
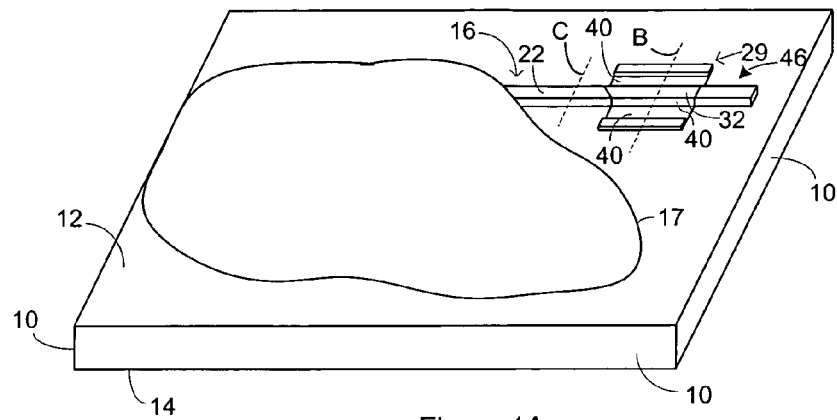
FIG. 1A through FIG. 1D illustrate an optical device having a light sensor configured to receive light signals from a waveguide. The light sensor includes field sources that are configured to generate a horizontal electrical field in a light-absorbing medium. The device illustrated in FIG. 1A through FIG. 1F employs doped regions as the field sources.
Figure 1B:
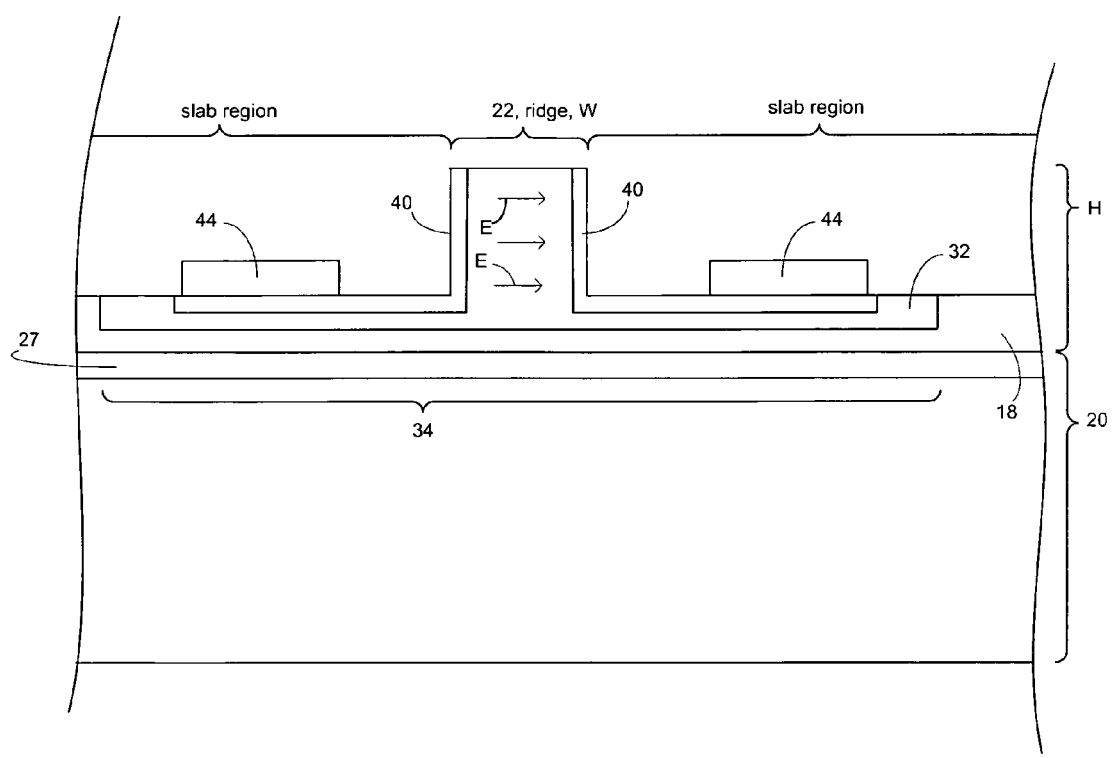
Figures 1C, 1D:
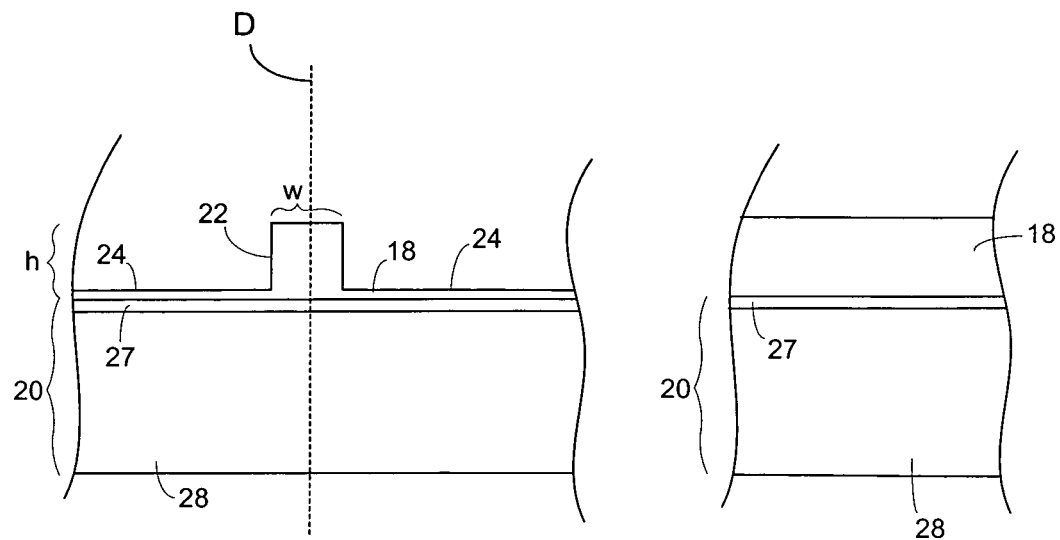

FIG. 1A through FIG. 1D illustrate an optical device having a light sensor configured to receive light signals from a waveguide. FIG. 1A is a perspective view of the device. FIG. 1B is a cross-section of the light sensor. For instance, FIG. 1B is a cross-section of the device shown in FIG. 1A taken along the line labeled B. FIG. 1C is a cross-section of the waveguide. For instance, FIG. 1C is a cross-section of the device shown in FIG. 1A taken along the line labeled C. FIG. 1D is a cross-section of the optical device shown in FIG. 1C taken along the line labeled D and extending parallel to the longitudinal axis of the waveguide.

The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of the substrate, and/or the bottom side of the substrate.

The illustrated device includes lateral sides 10 (or edges) extending from a top side 12 to a bottom side 14. The propagation direction of light signals along the length of the waveguides on a planar optical device generally extends through the lateral sides 10 of the device. The top side 12 and the bottom side 14 of the device are non-lateral sides.

The device includes one or more waveguides 16 that carry light signals to and/or from optical components 17. Examples of optical components 17 that can be included on the device include, but are not limited to, one or more components selected from a group consisting of facets through which light signals can enter and/or exit a waveguide, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a signal onto a light signal, light sensors that convert an light signal to an electrical signal, and vias that provide an optical pathway for a light signal traveling through the device from the bottom side 14 of the device to the top side 12 of the device. Additionally, the device can optionally, include electrical components. For instance, the device can include electrical connections for applying a potential or current to a waveguide and/or for controlling other components on the optical device.

The waveguide 16 is defined in a light-transmitting medium 18 positioned on a base 20. For instance, the waveguide 16 is partially defined by a ridge 22 extending upward from a slab region of the light-transmitting medium. In some instances, the top of the slab region is defined by the bottom of trenches 24 extending partially into the light-transmitting medium 18 or through the light-transmitting medium 18. Suitable light-transmitting media include, but are not limited to, silicon, polymers, silica, SiN, GaAs, InP and $LiNbO_3$. One or more cladding layers are optionally positioned on the light-transmitting medium. The one or more cladding layers can serve as a cladding for the waveguide 16 and/or for the device. When the light-transmitting medium 18 is silicon, suitable cladding layers include, but are not limited to, silicon, polymers, silica, SiN, GaAs, InP and $LiNbO_3$.

The portion of the base 20 adjacent to the light-transmitting medium 18 is configured to reflect light signals from the waveguide 16 back into the waveguide 16 in order to constrain light signals in the waveguide 16. For instance, the portion of the base 20 adjacent to the light-transmitting medium 18 can be an optical insulator 27 with a lower index of refraction than the light-transmitting medium 18. The drop in the index of refraction can cause reflection of a light signal from the light-transmitting medium 18 back into the light-transmitting medium 18. The base 20 can include the optical insulator 27 positioned on a substrate 28. In one example, the device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate. The layer of silica can serve as the optical insulator 27 and a silicon substrate can serve as the substrate 28.

The optical device also includes a light sensor 29 configured to receive a light signal guided by the one or more waveguides 16. The light sensor 29 is configured to convert the light signal to an electrical signal. Accordingly, the light signal can be employed to detect receipt of light signals. For instance, the light sensor 29 can be employed to measure the presence of a light signal, intensity of a light signal and/or power of a light signal. Although FIG. 1A illustrates a waveguide 16 carrying the light signal between the one or more components and the light sensor 29, the device can be constructed such that the waveguide 16 carries the light signal directly from an optical fiber to the light sensor 29.

A suitable light sensor 29 includes a light-absorbing medium 32 that absorbs light signals. The light-absorbing medium 32 is positioned to receive at least a portion of a light signal traveling along the waveguide 16. As is evident in FIG. 1C, the light sensor includes a ridge 22 of light-absorbing medium 32 extending upward from a slab region of the light-absorbing medium 32. The ridge 22 of light-absorbing medium 32 defines a portion of a sensor waveguide that guides the light signal through the light sensor. The slab region of the light-absorbing medium 32 and the ridge 22 of the light-absorbing medium 32 are both positioned on a seed portion 34 of the light-transmitting medium 18. The light sensor also includes a seed portion 34 of the light-transmitting medium 18. The seed portion 34 of the light-transmitting medium 18 is positioned on the base 20 with the seed portion 34 of the light-transmitting medium 18 being between the light-absorbing medium 32 and the base 20. In some instances, the seed portion 34 of the light-transmitting medium 18 contacts the insulator 27.

The seed portion 34 of the light-transmitting medium 18 can be continuous with the light-transmitting medium 18 included in the waveguide 16 or spaced apart from the waveguide 16. When the light signal enters the light sensor, a portion of the light signal can enter the seed portion 34 of the light-transmitting medium 18 and another portion of the light signal enters the light-absorbing medium 32. Accordingly, the light-absorbing medium 32 can receive only a portion of the light signal. In some instances, the light sensor can be configured such that the light-absorbing material receives the entire light signal. When the light sensor is configured such that the seed portion of the light-transmitting medium 18 receives a portion of the light signal, the part of the seed portion that contacts the base can define a portion of the sensor waveguide. In these instances, the seed portion of light-transmitting medium 18 can act together with the light-absorbing medium to define all or a portion of the sensor waveguide.

During the fabrication of the device, the seed portion 34 of the light-transmitting medium 18 can be used to grow the light-absorbing medium 32. For instance, when the light-transmitting medium 18 is silicon and the light-absorbing medium 32 is germanium, the germanium can be grown on the silicon. As a result, the use of the light-transmitting medium 18 in both the waveguides 16 and as a seed layer for growth of the light-absorbing medium 32 can simplify the process for fabricating the device.

During operation of the light sensor 29, a reverse bias electrical field is applied across the light-absorbing medium 32. When the light-absorbing medium 32 absorbs a light signal, an electrical current flows through the light-absorbing medium 32. As a result, the level of electrical current through the light-absorbing medium 32 indicates receipt of a light signal. Additionally, the magnitude of the current can indicate the power and/or intensity of the light signal. Different light-absorbing medium 32 can absorb different wavelengths and are accordingly suitable for use in a sensor 29 depending on the function of the sensor 29. A light-absorbing medium 32 that is suitable for detection of light signals used in communications applications includes, but are not limited to, germanium, silicon germanium, silicon germanium quantum well, GaAs, and InP. Germanium is suitable for detection of light signals having wavelengths in a range of 1300 nm to 1600 nm.

The light-absorbing medium 32 includes doped regions 40 on the lateral sides of the ridge 22. The doped regions 40 each extends from the ridge 22 into the slab region of the light-absorbing medium 32. The transition of a doped region 40 from the ridge 22 of the light-absorbing medium 32 into the slab region of the light-absorbing medium 32 can be continuous and unbroken as is evident from FIG. 1B.

Each of the doped regions 40 can be an N-type doped regions or a P-type doped region. In some instances, the light-absorbing medium 32 includes a doped region 40 that is an N-type doped region and a doped region 40 that is a P-type doped region. The separation between the doped regions 40 in the light-absorbing medium 32 results in the formation of PIN (p-type region-insulator-n-type region) junction in the light sensor 29.

In the light-absorbing medium 32, suitable dopants for N-type regions include, but are not limited to, phosphorus and/or arsenic. Suitable dopants for P-type regions include, but are not limited to, boron. The doped regions 40 are doped so as to be electrically conducting. A suitable concentration for the P-type dopant in a P-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$. A suitable concentration for the N-type dopant in an N-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$.

Each doped region 40 is in contact with an electrical conductor 44 on the slab region of the light-absorbing medium 32. During operation of the light sensor, electronics can apply electrical energy to the electrical conductors 44. Since the electrical conductors 44 are in electrical communication with the doped regions, the electronics apply a reverse bias to the doped regions through the electrical conductors. The reverse bias forms the electric field in the light-absorbing medium 32. As is evident from the arrows labeled E in FIG. 1B, the doped regions 40 in the light-absorbing medium 32 serve as the field sources for the electrical field.

Although FIG. 1B illustrates each of the doped regions extending only part way into the light-absorbing medium included in the slab regions, one or more of the doped regions can extend through the light-absorbing medium. Accordingly, one or more of the doped regions can contact the light-transmitting medium 18. Further, one or more of the doped regions can extend through the light-absorbing medium and into the light-transmitting medium 18.

Figure 1E:
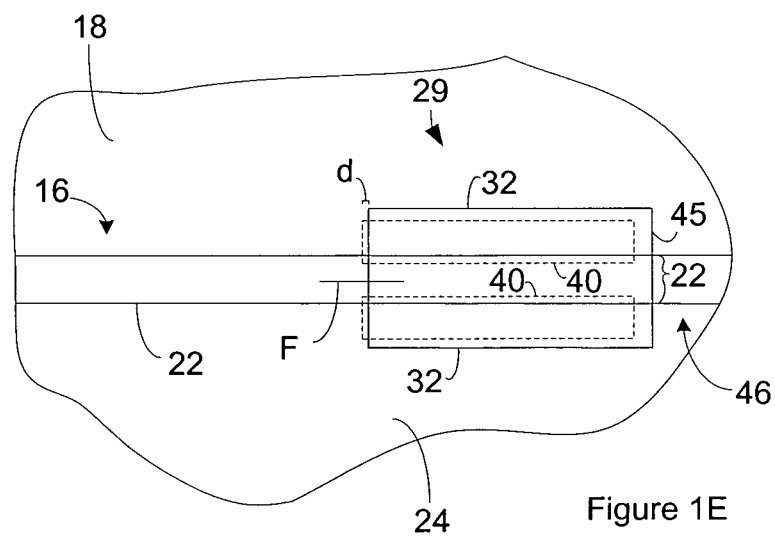
FIG. 1E is a topview of the device shown in FIG. 1A through FIG. 1D.

FIG. 1E is a topview of the device shown in FIG. 1A. The electrical conductors 44 are not shown in FIG. 1E in order to illustrate the relationships between the underlying features. Additionally, the doped regions 40 are each shown by dashed lines in order to prevent these features from being confused with other features in the drawing.

Each of the doped regions 40 extends from within the light-absorbing medium 32, across an interface between an exit facet of the light-transmitting medium 18 and an input side of the light light-absorbing medium, and into the light-transmitting medium. For instance, the portion of the doped region in the light-absorbing medium 32 is continuous and in contact with the portion of the doped region in the light-transmitting medium 18. Accordingly, each of the doped regions is positioned in both the light-absorbing medium 32 and the light-transmitting medium 18. As a result, there is not a gap between the doped regions and the input side of the light light-absorbing medium. The removal of this gap reduces the voltage that needs to be applied to the light sensor in order to achieve a particular speed. Accordingly, the removal of this gap increases the efficiency of the light sensor.

In some instances, one or more of the doped regions extends from within the light-absorbing medium 32 to the input side of the light light-absorbing medium without extending into the light-transmitting medium. This arrangement reduces the electrical field that is formed in the light-transmitting medium 18 during operation of the light sensor. However, challenges associated with aligning different components of the device during the fabrication process may make this location of the doped regions more difficult to fabricate. Additionally, the electrical field formed between the doped regions in the light-transmitting medium 18 does not substantially affect performance of the light sensor because the device is generally operated under reverse bias and hence no charge carriers are introduced into this region, which may happen under forward bias. Charge carriers are able to absorb the light and hence affect performance. Further, the electroabsorption affect in this medium is expected to be small. As a result, the extension of the doped regions into the light-transmitting medium 18 is easier to fabricate without a substantial reduction in the performance of the light sensor.

A suitable distance, d (labeled d in FIG. 1E) for one or more of the doped regions is less than 10 μm, 5 μm or 1 μm, and/or more than 0.5 μm, 0.75 μm, or 0.8 μm.

As is also evident in FIG. 1E, the doped regions do not extend from within the light-absorbing medium through the output side 45 of the light light-absorbing medium, and into the light-transmitting medium. More specifically, the doped regions do not extend from within the sensor waveguide into an output waveguide 46. In some instances, the light sensor is designed such that the light signal is believed to be almost completely absorbed or completely absorbed before the light signal would exit from between the doped regions. In these instance, an insubstantial portion of the light signal exits from between the doped regions 40. Accordingly, extending the doped regions 40 further toward the output side of the light light-absorbing medium would provide a source of dark current but very little photocurrent or even no photocurrent. Dark current is undesirable because it is current through the light sensor that is not a result of the light sensor receiving light. On the other hand, photocurrent is desirable since it is current through the light sensor as a result of the light sensor receiving light. As a result, in these instances, extending the doped regions 40 further toward the output side of the light light-absorbing medium could substantially decrease the performance of the light sensor.

Additionally, it is generally not desirable to extend the doped regions from within the light-absorbing medium through the output side of the light light-absorbing medium because this can introduce unnecessary dark current and degrade the performance of the device. As a result, the location of the doped regions is asymmetrical relative to the center of the length of the waveguide that is at least partially defined by the light-absorbing medium (the sensor waveguide). For instance, the distance between the end of a doped region 40 and a plane that is both perpendicular to the base at center of the sensor waveguide is longer on one side of the plane than on another side of the place as is evident from FIG. 1E.

Although FIG. 1E illustrates a gap between the doped regions and the output side of the light light-absorbing medium, in some instances, one or more of the doped regions extends from within the light-absorbing medium to the output side of the light light-absorbing medium without extending into the light-transmitting medium 18 and/or one or more of the doped regions extends from within the light-absorbing medium through the output side of the light light-absorbing medium and into the light-transmitting medium 18.

FIG. 1A and FIG. 1E each illustrate an output waveguide 46 located after the light sensor. In some instance the light sensor is designed such that the output waveguide 46 does not receive a substantial amount of the light signal or receives none of the light signal. As a result, in some instances, the output waveguide is optional. However, the presence of an output waveguide may be an artifact of the fabrication process and/or may simplify the fabrication process. For instance, forming the output waveguide may improve the results of epitaxial growth performed during the fabrication of the device.

Figure 1F:
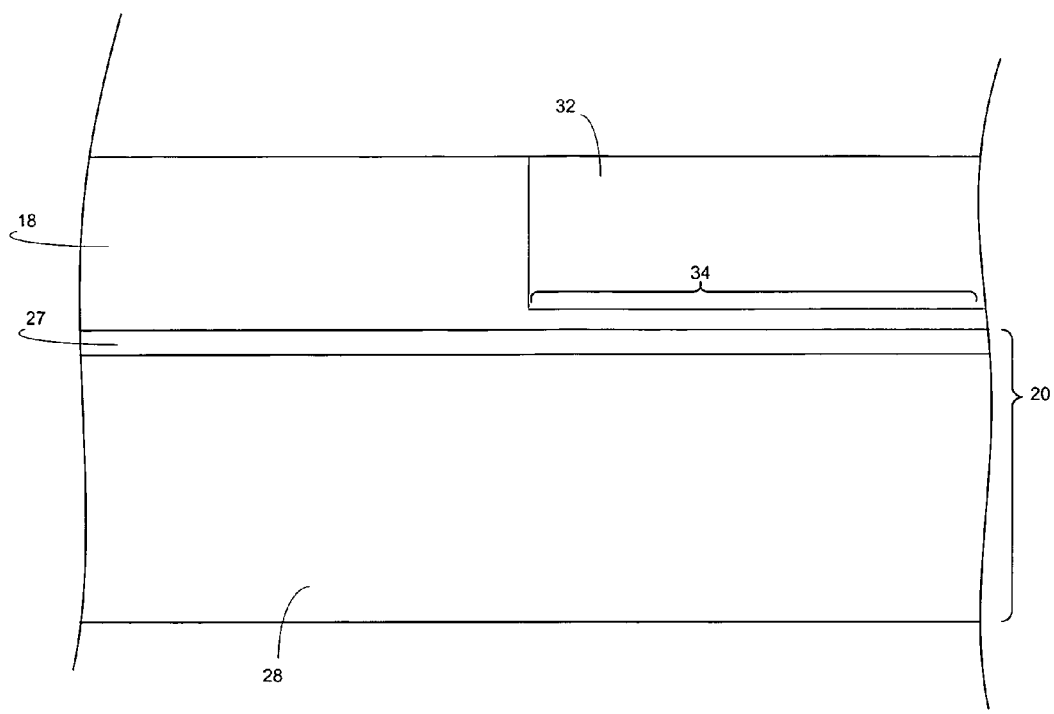
FIG. 1F is a cross section of the device shown in FIG. 1A through FIG. 1E taken along the line labeled F in FIG. 1E.

FIG. 1F is a cross section of the device shown in FIG. 1A through FIG. 1E taken along the line labeled F in FIG. 1E. FIG. 1F shows the relationship between the heights of the light-absorbing medium 32 and the light-transmitting medium 18 relative to the base. In some instances, the top of the light-absorbing medium 32 and the light-transmitting medium 18 are flush as shown in FIG. 1E. For instance, FIG. 1E shows the top of the light-absorbing medium 32 substantially the same distance from the base as the top of the light-transmitting medium 18. The top of the light-absorbing medium 32 need not be flush with the light-transmitting medium 18. In some instances, the top of the light-absorbing medium 32 is above the top of the light-transmitting medium 18 or the top of the light-transmitting medium 18 is above the top of the light-absorbing medium 32.

FIG. 1F also show the interface between the light-absorbing medium 32 and the light-transmitting medium 18. Although the light-absorbing medium 32 is shown directly contacting the light-transmitting medium 18, there can be one or more other layers of material positioned at this interface. For instance, there can be one or more layers that act together or individually as an anti-reflective material between the light-absorbing medium 32 and the light-transmitting medium 18.

The light sensor is suitable for use with waveguide dimensions that are suitable for use in communications applications. Accordingly, a suitable height for the waveguide 16 (labeled h in FIG. 1C) includes, but is not limited to, heights greater than 1 µm, 2 µm, and 3 µm. A suitable width for the waveguide 16 (labeled w in FIG. 1C) includes, but is not limited to, widths greater than 0.5 µm, 2 µm, and 3 µm. Suitable waveguide dimension ratios (width of the waveguide 16:height of the waveguide 16) include, but are not limited to, ratios greater than 0.15:1, 0.5:1, and 1:1 and/or less that 0.25:1, 1:1, and 2:1.

The increased dimensions of the waveguide 16 are also associated with increased dimensions of the light-absorbing medium 32. For instance, a suitable height for the waveguide in the light sensor (labeled H in FIG. 1B) includes, but is not limited to, heights greater than 1 µm, 2 µm, and 3 µm. A suitable width for the light-absorbing medium 32 (labeled W in FIG. 1B) includes, but is not limited to, widths greater than 0.5 µm, 1.5 µm, and 2 µm. Suitable light-absorbing medium 32 dimension ratios (width of the waveguide 16:height of the waveguide 16) include, but are not limited to, ratios greater than 0.15:1, 0.5:1, and 0.75:1 and/or less than 0.25:1, 0.75:1, and 1:1.

Figure 2:
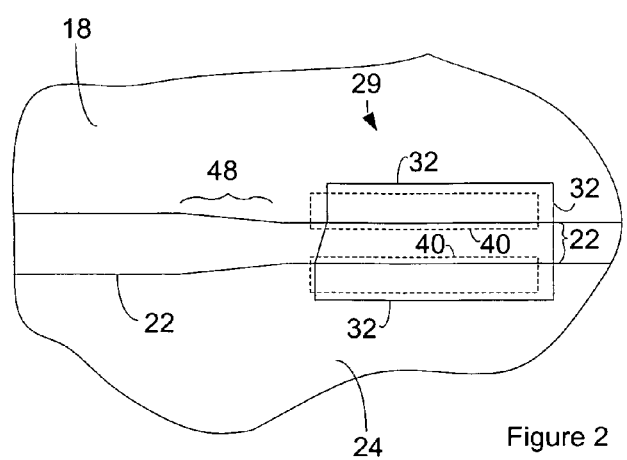
FIG. 2 is a topview of another embodiment of the device shown in FIG. 1A through FIG. 1F.

FIG. 2 is a topview of an optical device where the waveguide 16 includes a taper 48. The taper 48 can be a horizontal taper and need not include a vertical taper although a vertical taper is optional. The taper 48 is positioned before the light sensor. For instance, the horizontal taper occurs in the light-transmitting medium 18 rather than in the light-absorbing medium 32. The taper 48 allows the light-absorbing medium 32 to have a narrower width than the waveguide 16. The reduced width of the light-absorbing medium 32 increases the speed of the light sensor. The optical component preferably excludes additional components between the taper and light sensor although other components may be present.

FIG. 2 also shows the interface between the input side of the light-absorbing medium 32 and the light-transmitting medium 18 having an angle that is non-perpendicular relative to the direction of propagation of light signals through the waveguide 16 at the interface. In some instances, the interface is substantially perpendicular relative to the base 20 while being non-perpendicular relative to the direction of propagation. The non-perpendicularity of the interface reduces the effects of back reflection. Suitable angles for the interface relative to the direction of propagation include but are not limited to, angles between 80° and 89°, and angles between 80° and 85°.

As is evident from FIG. 2, as the left side of the doped regions 40 are shifted to the right, one of the doped regions 40 can extend into the light-transmitting medium 18 while the other doped region 40 does not extend into the light-transmitting medium 18. Because of the angle of the interface, this arrangement can exist even while the doped regions are aligned with each other. As a result, the light sensor can include one or more doped regions 40 that extend from the light-absorbing medium 32 into the light-transmitting medium 32.

The optical device can be constructed using fabrication technologies that are employed in the fabrication of integrated circuits, optoelectronic circuits, and/or optical devices. For instance, the ridge 22 for the waveguide 16 and/or the seed portion 34 can be formed in the light-transmitting medium 18 using etching technologies on a silicon-on-insulator wafer. Horizontal tapers can be readily formed using masking and etching technologies. Suitable methods for forming vertical tapers are disclosed in U.S. patent application Ser. No. 10/345,709, filed on Jan. 15, 2003, entitled "Controlled Selectivity Etch for Use with Optical Component Fabrication," and incorporated herein in its entirety.

FIG. 3A through FIG. 11C illustrate a method of generating an optical device constructed according to FIG. 1A through FIG. 1F but with an angled interface as show in FIG. 2. The method is illustrated using a silicon-on-insulator wafer or chip as the starting precursor for the optical device. However, the method can be adapted to platforms other than the silicon-on-insulator platform.

Figure 3A:
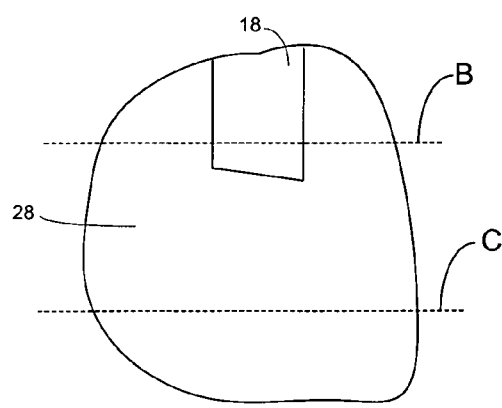
Figure 3B:
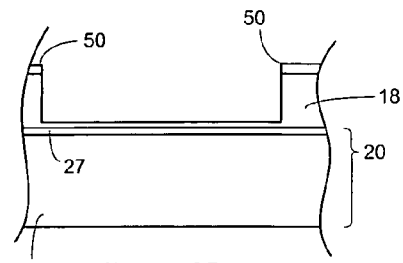
Figure 3C:
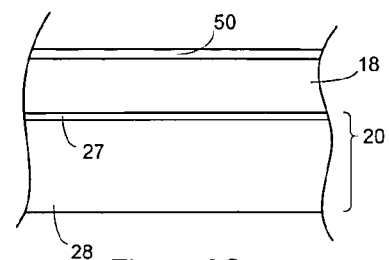

FIG. 3A through FIG. 3C illustrate a first mask 50 formed on the silicon-on-insulator wafer or chip to provide a device precursor. FIG. 3A is a topview of the device precursor. FIG. 3B is a cross-section of the device precursor shown in FIG. 3A taken along the line labeled B. FIG. 3C is a cross-section of the device precursor shown in FIG. 3A taken along the line labeled C. The first mask 50 leaves exposed a region of the device precursor where a sensor cavity 52 is to be formed while the remainder of the illustrated portion of the device precursor is protected. The sensor cavity 52 is the region of the device precursor where the light-absorbing medium 32 is to be formed. A first etch is then performed so as to form the sensor cavity 52. The first etch yields the device precursor of FIG. 3A through FIG. 3C. The first etch is performed such that the seed portion 34 of the light-transmitting medium 18 remains on the base 20. Accordingly, the first etch is terminated before the base 20 is reached.

A suitable first mask 50 includes, but is not limited to, a hard mask such as a silica mask. A suitable first etch includes, but is not limited to, a dry etch.

Figure 4A:
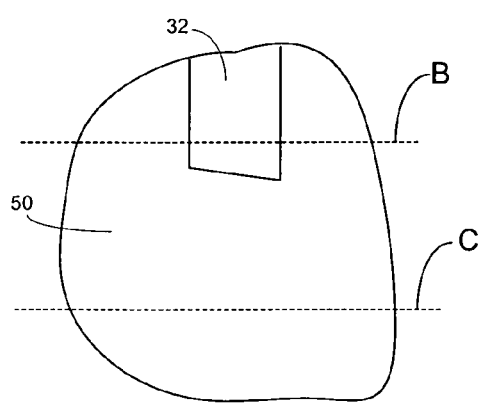
Figure 4B:
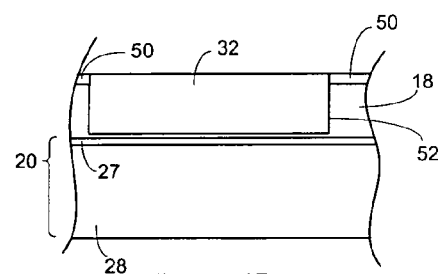
Figure 4C:
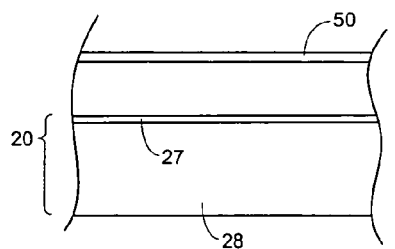

As shown in FIG. 4A through FIG. 4C, the light-absorbing medium 32 is formed in the sensor cavity 52 of FIG. 3A through FIG. 3C. FIG. 4A is a topview of the device precursor. FIG. 4B is a cross-section of the device precursor shown in FIG. 4A taken along the line labeled B. FIG. 4C is a cross-section of the device precursor shown in FIG. 4A taken along the line labeled C. When the light-transmitting medium 18 is silicon and the light-absorbing medium 32 is germanium, the germanium can be grown on the seed portion 34 of the silicon. After formation of the light light-absorbing medium 32, the device precursor can be planarized to provide the device precursor of FIG. 4A through FIG. 4C.

The first mask 50 can be removed from the device precursor of FIG. 4A through FIG. 4C and a second mask 54 can be formed on the device precursor so as to provide the device precursor of FIG. 5A through FIG. 5C. FIG. 5A is a topview of the device precursor. FIG. 5B is a cross-section of the device precursor shown in FIG. 5A taken along the line labeled B. FIG. 5C is a cross-section of the device precursor shown in FIG. 5A taken along the line labeled C. The second mask 54 is formed such that the regions where the trenches 24 are to be formed remain exposed while protecting the remainder of the illustrated portion of the device precursor. A suitable second mask 54 includes a hard mask such as a silica mask.

A second etch is performed on the device precursor of FIG. 5A through FIG. 5C to provide the device precursor of FIG. 6A through FIG. 6C. FIG. 6A is a topview of the device precursor. FIG. 6B is a cross-section of the device precursor shown in FIG. 6A taken along the line labeled B. FIG. 6C is a cross-section of the device precursor shown in FIG. 6A taken along the line labeled C. The second etch is stopped when the first portion of the etched material is etched to about the depth desired for the trenches 24. However, the second etch does not etch through the light-absorbing medium. As a result, a ridge of the light-absorbing medium extends upwards from slab regions of the light-absorbing medium.

Since the second etch etches the light-transmitting medium 18 and the light-absorbing medium 32 concurrently, the second etch etches the light-transmitting medium 18 and the light-absorbing medium 32 to different depths. For instance, FIG. 6B illustrates the light-absorbing medium 32 etched deeper than the light-transmitting medium 18. A suitable second etch includes, but is not limited to, a dry etch that can etch both the light-transmitting medium 18 and the light-absorbing medium 32.

A third mask 56 is formed on the device precursor of FIG. 6A through FIG. 6C as shown by the device precursor of FIG. 7A through FIG. 7C. FIG. 7A is a topview of the device precursor. Although the location of the light-absorbing medium 32 is not visible from above the device precursor of FIG. 7A, the location of the light-absorbing medium 32 is illustrated as a dashed line in order to show the spatial relationship between the third mask 56 and the underlying light-absorbing medium 32. FIG. 7B is a cross-section of the device precursor shown in FIG. 7A taken along the line labeled B. FIG. 7C is a cross-section of the device precursor shown in FIG. 7A taken along the line labeled C. Portions of the third mask 56 are formed over the second mask 54. The third mask 56 is formed such that the combination of the second mask 54 and the third mask 56 leave the trenches 24 associated with the waveguide 16 exposed while the remainder of the illustrated portion of the device precursor is protected. A third etch is then performed so as to provide the device precursor of FIG. 7A through FIG. 7C. The third etch is performed such that the trenches 24 associated with the waveguide 16 and the light sensor are etched to about the same depth. As a result, the third etch corrects for the depth differential that is evident in FIG. 6B and FIG. 6C.

A suitable third mask 56 includes, but is not limited to, a photoresist. A suitable third etch includes, but is not limited to, a dry etch.

Figure 8A:
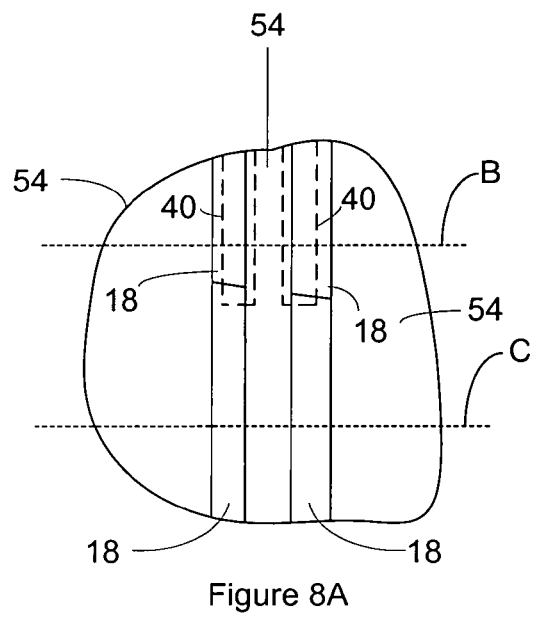
Figure 8B:
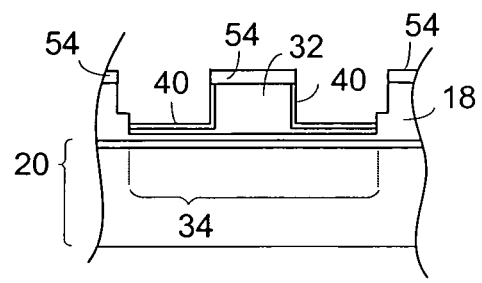
Figure 8C:
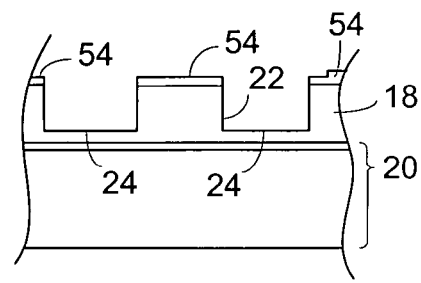

The third mask 56 is removed and doped regions 40 are formed in the light-transmitting medium 18 and in the light-absorbing medium 32 so as to provide the device precursor of FIG. 8A through FIG. 8C. FIG. 8A is a topview of the device precursor. FIG. 8B is a cross-section of the device precursor shown in FIG. 8A taken along the line labeled B. FIG. 8C is a cross-section of the device precursor shown in FIG. 8A taken along the line labeled C. Because the doped regions overlap several different features on the precursor, in FIG. 8A, the locations of the doped regions are shown by dashed lines so they can be distinguished from the overlapped features. Additionally, the location of the light-absorbing medium 32 in FIG. 8A is not shown in order to reduce confusion between the different features.

The n-type doped regions can be generated by forming a doping mask on the device precursor so the locations of the n-type doped regions are exposed and the remainder of the illustrated portion of the device precursor is protected. High angle dopant implant processes can be employed to form the n-type doped regions. The doping mask can then be removed. The same sequence can then be employed to form the p-type doped regions. The p-type doped regions can be formed before the n-type doped regions or the n-type doped regions can be formed before the p-type doped regions.

During the process of forming the doped regions, in some instances, the portion of each doped region located in the light-transmitting medium 18 is formed concurrently with the portion of the doped region located in the light-absorbing medium 32 rather then the two different portions being formed sequentially. As a result, in some instances, for each of the doped regions, the portion of the doped region in the light-transmitting medium 18 has the same concentration of dopant, or about the same concentration, as the portion of the doped region in the light-absorbing medium 32.

Figure 9A:
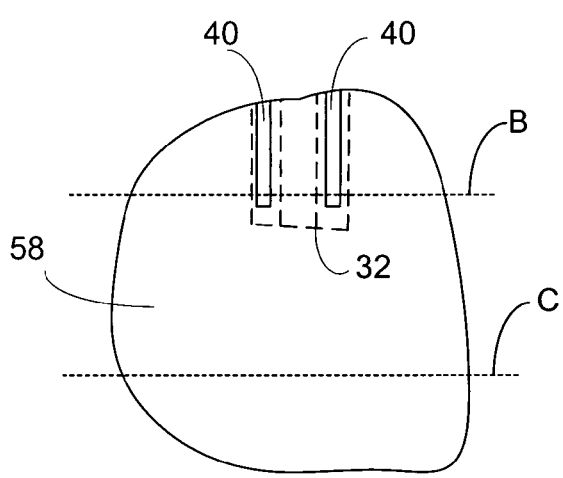
Figure 9B:
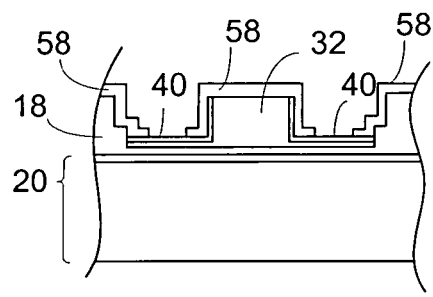
Figure 9C:
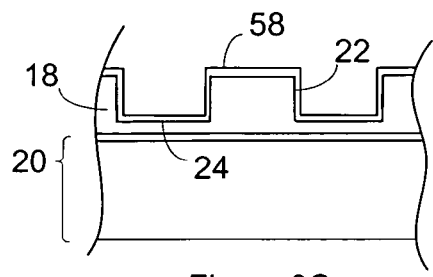

The second mask 54 is removed from the device precursor of FIG. 8A through FIG. 8C and a first cladding 58 is formed on the device precursor so as to provide the device precursor of FIG. 9A through FIG. 9C. FIG. 9A is a topview of the device precursor. Although the location of the light-absorbing medium 32 is not visible from above the device precursor of FIG. 9A, the light-absorbing medium 32 is illustrated as a dashed line in order to show the spatial relationship between features on the device precursor. FIG. 9B is a cross-section of the device precursor shown in FIG. 9A taken along the line labeled B. FIG. 9C is a cross-section of the device precursor shown in FIG. 9A taken along the line labeled C. As is evident in FIG. 9A and FIG. 9B, the first cladding 58 is formed such that the portion of the doped regions 40 that are to be contacted by the electrical conductors 44 remain exposed and the remainder of the illustrated portion of the device precursor are protected by the first cladding 58. A suitable first cladding 58 includes, but is not limited to, PECVD deposited silica that is subsequently patterned using photolithography.

Figure 10A:
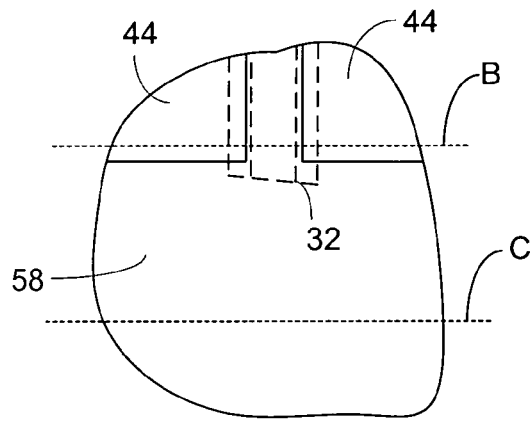
Figure 10B:
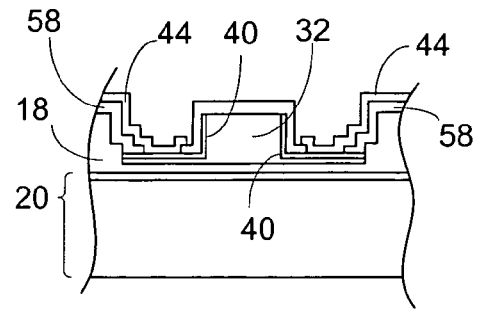
Figure 10C:
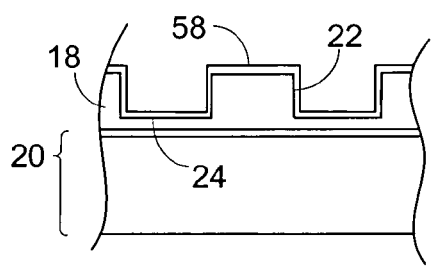

The electrical conductors 44 are formed on the device precursor of FIG. 9A and FIG. 9C so as to provide the device precursor of FIG. 10A through FIG. 10C. FIG. 10A is a topview of the device precursor. Although the location of the light-absorbing medium 32 is not visible from above the device precursor of FIG. 10A, the light-absorbing medium 32 is illustrated as a dashed line in order to show the spatial relationship between features on the device precursor. FIG. 10B is a cross-section of the device precursor shown in FIG. 10A taken along the line labeled B. FIG. 10C is a cross-section of the device precursor shown in FIG. 10A taken along the line labeled C. As is evident in FIG. 10A and FIG. 10B, the electrical conductors 44 can be formed so each electrical conductor 44 extend from one of the doped regions 40, out of the trench 24, and over the light-transmitting medium 18. Suitable electrical conductors 44 include metals such as titanium and aluminum. The metals can be deposited by sputtering and patterned by photolithography.

Figure 11A:
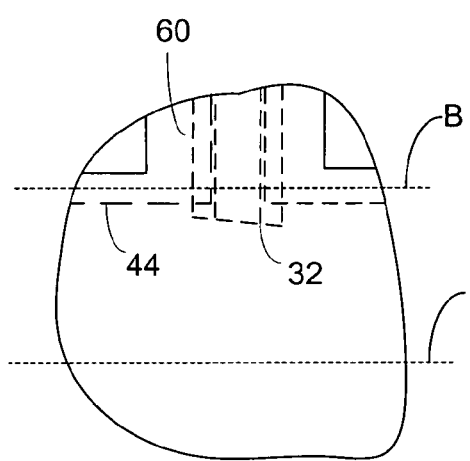
Figure 11B:
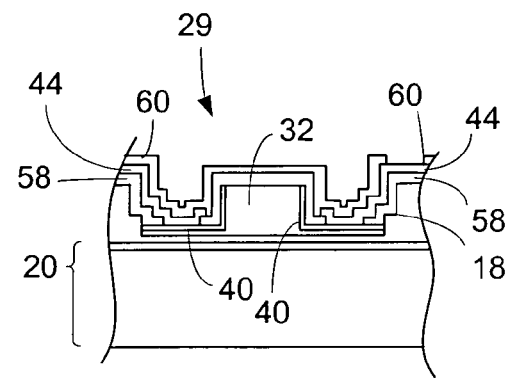
Figure 11C:
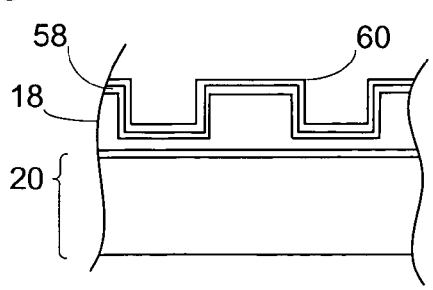

A second cladding 60 can optionally be formed on the device precursor of FIG. 10A through FIG. 10C so as to provide the device precursor of FIG. 11A through FIG. 11C. FIG. 11A is a topview of the device precursor. Although the location of the light-absorbing medium 32 and the electrical conductors 44 are not visible from above the device precursor of FIG. 11A, the light-absorbing medium 32 and electrical conductors 44 is illustrated by dashed lines in order to show the spatial relationship between features on the device precursor. FIG. 11B is a cross-section of the device precursor shown in FIG. 11A taken along the line labeled B. FIG. 11C is a cross-section of the device precursor shown in FIG. 11A taken along the line labeled C. As is evident in FIG. 11A and FIG. 11B, the second cladding 60 can be patterned such that the second cladding 60 defines contact pads the electrical conductors 44. A suitable second cladding 60 includes, but is not limited to, PECVD deposited SiN that is subsequently patterned using photolithography. After removing photoresists formed during photolithography, the device precursor of FIG. 11A through FIG. 11C can be sintered to form the optical device.

The device can be used in conjunction with electronics that are in electrical communication with the contact pads. The electronics can apply electrical energy to the contact pads so as to form a reverse bias across the PIN junction in the light sensor. When the light-absorbing medium 32 receives a light signal, an electrical current flows through the light-absorbing medium 32 indicating the receipt of the light signal.

Although the method of FIG. 3A through FIG. 11C shows the interface according to FIG. 2, the method can be adapted to form the interface according to FIG. 1E by changing the angle generated as a result of etching with the first mask 50 in place.

Although the above masks are described as the first mask, second mask, etc., the number first, second, and third does not indicate sequence but instead provides an identifier that indicates different masks. As a result, it may be possible to generate the desired device by forming a mask with a higher number before forming the lower numbered mask.

The above discussion discloses the electrical conductors 44 contacting the portion of the doped region 40 in the light-absorbing medium 32. For instance, the electrical conductors 44 are shown contacting the portion of the doped region located in the slab region of the light-absorbing medium 32 in the light-absorbing medium 32. However, in some instances, one or more of the electrical conductors 44 contacts the portion of the doped region 40 located in the light-transmitting medium 18. The contact is such that there is electrical communication between the electrical conductor 44 and the contacted portion of the doped region 40. In these instances, the portion of the doped region located in the light-transmitting medium 18 provides electrical communication between the contacted electrical conductor 44 and the portion of the doped region in the light-absorbing medium 32. The contact between the electrical conductor 44 and the contacted portion of the doped region can be in the slab region of the light-transmitting medium 18 and/or in the ridge of the light-transmitting medium 18. In these instances, some embodiments of the light sensor exclude the slab region of the light-absorbing medium 32 while other embodiments include the slab region of the light-absorbing medium 32. In embodiments that exclude the slab region of the light-absorbing medium 32, the second etch disclosed in the context of FIG. 6A through FIG. 6C can be performed until the second etch etches through the slab region of the light-absorbing medium 32. As a result, after the second etch, the underlying seed portion 34 of the light-transmitting medium 18, the base 20, the insulator 27, or the substrate 28 can be exposed. Additionally, in embodiments that exclude the slab region of the light-absorbing medium 32, the third etch disclosed in the context of FIG. 7A through FIG. 7C need not be performed.

Although the light sensor is described as being operated with a reverse bias applied across the light sensor, the light sensor can be operated as a light sensor under other conditions. For instance, the lights sensor can be operated with a zero bias. As an example, the light sensor can be operated in a photovoltaic mode.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
   an input waveguide on a base, the input waveguide configured to guide a light signal through a light-transmitting medium to a light sensor; and
   the light sensor including
      a sensor waveguide on the base,
      the sensor waveguide receives the light signal from the input waveguide,
      the sensor waveguide includes a light-absorbing medium having an input side interfaced with the light-transmitting medium such that at least a portion of the light signal received by the sensor waveguide travels through the input side of the light-absorbing medium, the light-absorbing medium having lateral sides connecting a bottom side and a top side such that the bottom side is between the base and the top side, the input side being one of the lateral sides,
      the light-transmitting medium and the light-absorbing medium being different materials,
      the light-absorbing medium including doped regions,
   one or more of the doped regions each extending from within the light-absorbing medium across the input side of the light-absorbing medium and into the light-transmitting medium beyond the input side.

2. The device of claim 1, wherein the input side of the light-absorbing medium contacts the light-transmitting medium.

3. The device of claim 1, wherein the light-absorbing medium includes a ridge extending from slab regions, the slab regions being on opposing sides of the ridge,
   the doped regions being positioned on opposing sides of the ridge.

4. The device of claim 3, wherein each of the doped regions is included in a lateral side of the ridge and is also included in one of the slab regions.

5. The device of claim 4, wherein electrical contacts are each positioned on the light-absorbing medium included in one of the slab regions such that the ridge is positioned between the electrical contacts.

6. The device of claim 5, wherein each electrical contact contacts the light-absorbing medium.

7. The device of claim 1, wherein the light-absorbing medium includes a ridge extending from slab regions, and
at least a portion of the electrical field can form on a path from one of the slab regions, through light-absorbing medium under the ridge, and then to another one of the slab regions without entering the light transmitting medium.

8. The device of claim 1, wherein the light sensor includes a portion of the light-transmitting medium located between the light-absorbing medium and the base.

9. The device of claim 8, wherein the portion of the light-transmitting medium located between the light-absorbing medium and the base is continuous with the light-transmitting medium located outside of the light sensor.

10. The device of claim 8, wherein the portion of the light-transmitting medium located between the light-absorbing medium and the base receives a portion of the light signal entering the light sensor.

11. The device of claim 1, wherein the light-absorbing medium includes a ridge extending from slab regions, and
a portion of the light-absorbing medium included in the ridge is between the doped regions and is undoped.

12. The device of claim 1, wherein the light-absorbing material includes germanium.

13. The device of claim 1, wherein the light-transmitting medium and the light-absorbing medium contact one another at the interface, the interface being configured such that the light signal travels through the interface, the interface being at a non-perpendicular angle relative to a direction of propagation of the light signals through the input waveguide at the interface.

14. The device of claim 13, wherein the angle is between 80° and 85°.

15. The device of claim 1, wherein the light-transmitting medium includes silicon and the light-absorbing medium includes germanium.

16. The device of claim 1, wherein an output side of the sensor waveguide includes an interface between an output side of the light-absorbing medium and the light transmitting medium, and
the output side of the light-absorbing medium is located such that the direction of propagation of the light signal within the sensor waveguide passes through the output side of the light-absorbing medium and the doped regions do not extend from within the light-absorbing medium to the output side of the light-transmitting medium.

17. The device of claim 1, wherein the bottom side of the light-absorbing medium is the side of the light-absorbing medium closest to the base.

18. The device of claim 1, wherein the input side is perpendicular to the base.

19. The device of claim 1, wherein the input waveguide excludes the light-absorbing medium.

20. An optical device, comprising:
an input waveguide on a base, the input waveguide configured to guide a light signal through a light-transmitting medium to a light sensor; and
the light sensor including
a sensor waveguide on the base,
the sensor waveguide receives the light signal from the input waveguide,
the sensor waveguide includes a light-absorbing medium having an input side interfaced with the light-transmitting medium such that at least a portion of the light signal received by the sensor waveguide travels through the input side of the light-absorbing medium,
a direction of propagation of the light signals in the input waveguide at the interface extending across the input side into the light-absorbing medium,
the light-transmitting medium and the light-absorbing medium being different materials,
the light-absorbing medium including doped regions,
one or more of the doped regions each extending from within the light-absorbing medium across the input side of the light-absorbing medium and into the light-transmitting medium beyond the input side.

\* \* \* \* \*